3,156,503
TRAILER BODY SIDE WALL AND RAIL CONSTRUCTION

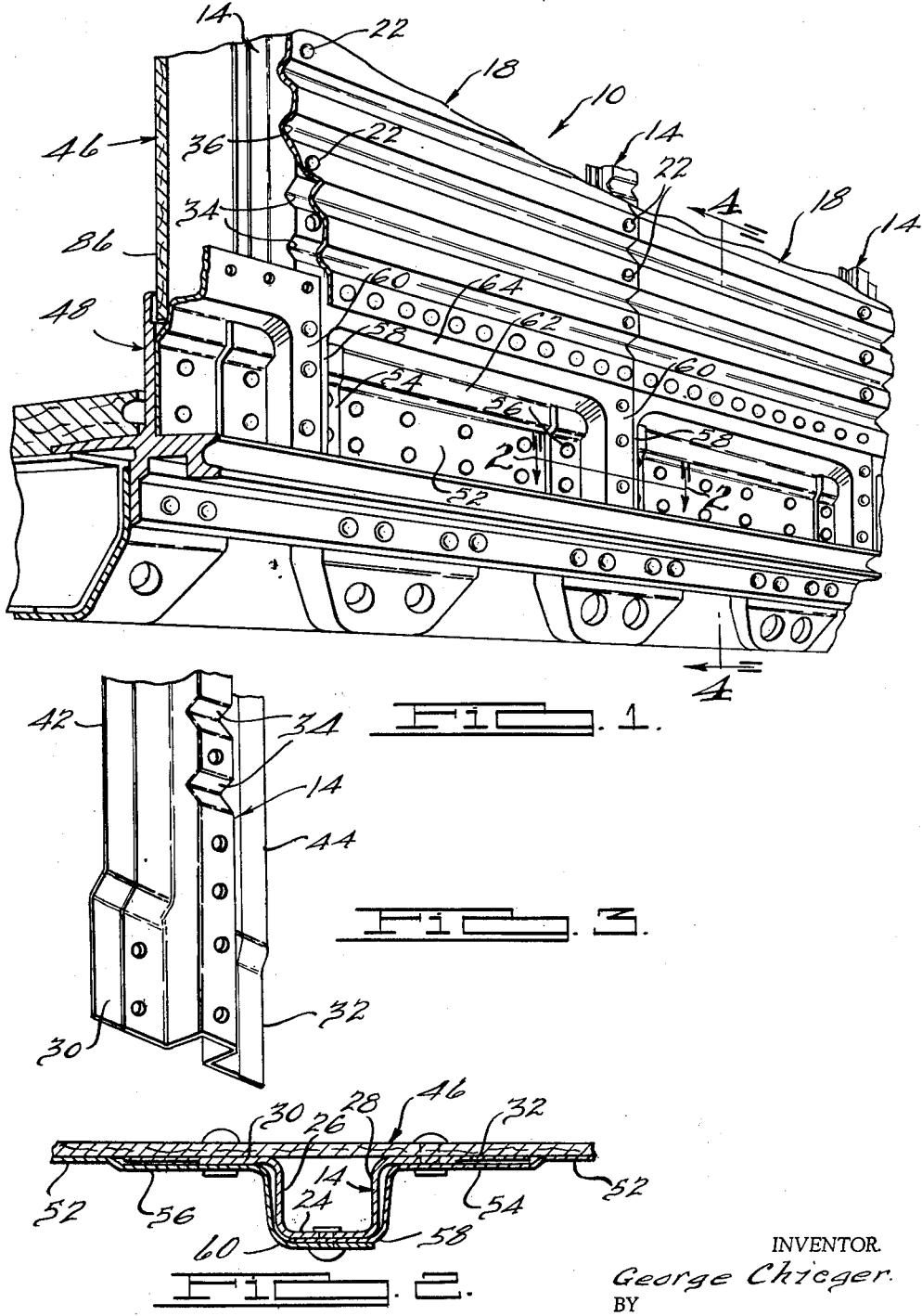

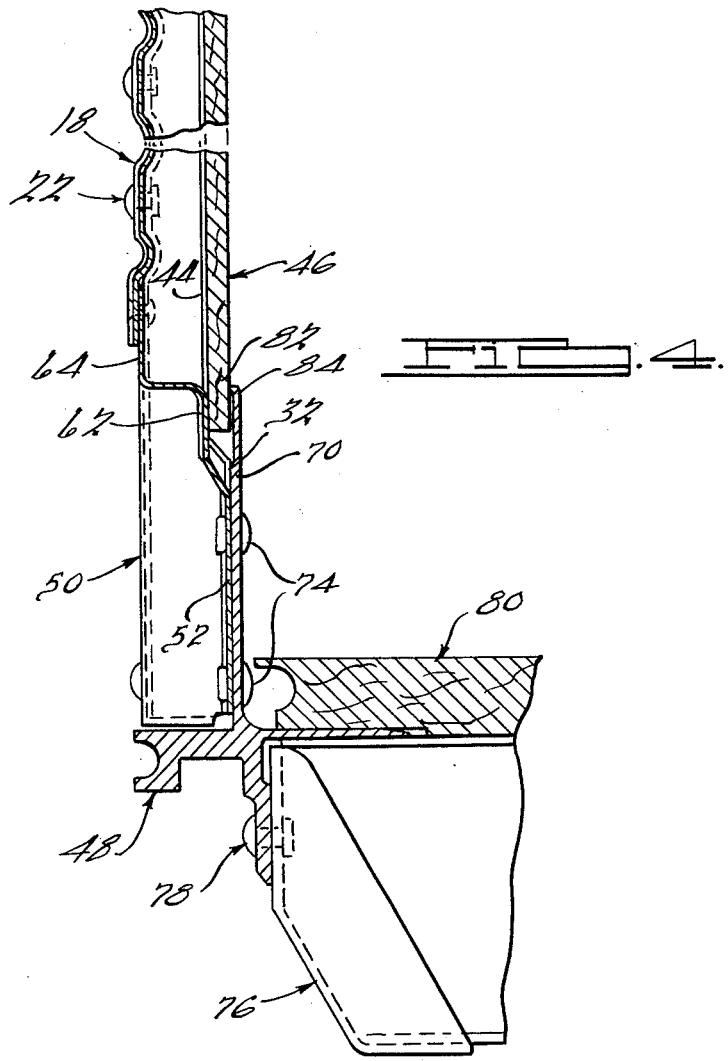

George Chieger, Birmingham, Mich., assignor to Fruehauf Corporation, Detroit, Mich., a corporation of Michigan
Filed Oct. 9, 1963, Ser. No. 314,923
2 Claims. (Cl. 296—28)

This invention relates generally to trailer constructions, and more particularly to an improved construction for joining the outer skin panels and lower side rails of heavy duty trucks, trailers, and the like.

Over-the-road trucks, trailers or the like, are required to withstand severe vibratory and torsional forces that tend to weaken and ultimately separate the junctures between the structural components of the vehicle. Accordingly, there is a constant endeavor to improve the construction of such over-the-road vehicles so as to maximize the life and efficiency thereof consistent with manufacturing economy.

The instant invention is directed to an improved means for joining the side wall panels of a heavy duty truck, trailer or the like, to complementary lower longitudinal side rails thereof. Practice of the instant invention results in a relatively compact, inexpensive and rugged assembly that solves many of the problems incident to joining the structural members involved.

Accordingly, one object of the instant invention is an improved construction for joining the side walls to the lower side rails of heavy duty trucks, trailers, and the like.

Another object is an improved juncture construction for the side walls and lower rails of a trailer that effects a mechanical holding of an inner wall liner.

Other objects and advantages of the instant invention will be apparent from the following specification, claims and drawings, wherein:

FIGURE 1 is a fragmentary perspective view of the lower side wall and lower rail of a heavy duty over-the-road vehicle;

FIG. 2 is a cross sectional view taken substantially on the line 2—2 of FIGURE 1;

FIG. 3 is a fragmentary perspective view of the lower end of a vertical post of the side wall;

FIG. 4 is a cross sectional view taken substantially along the line 4—4 of FIGURE 1.

Referring to FIGURE 1 of the drawings, a trailer construction in accordance with the instant invention comprises a plurality of vertical posts 14 to which complementary outer skin panels 18 are secured as by rivets 22. As best seen in FIG. 2, the posts 14 are of hat-shaped horizontal cross section defined by a bight portion 24, inwardly extending leg portions 26 and 28 and oppositely directed flange portions 30 and 32. The posts 14 are provided with vertically spaced generally V-shaped notches 34 for the acceptance of complementary V-shaped grooves 36 in the skin panel 18 thereby to form a structurally interlocked assemblage therewith.

As best seen in FIGURE 3, the flange portions 30 and 32 of each post 14 are provided with outwardly flared portions 42 and 44 for the acceptance of an inner wall liner 46 made from, for example, plywood sheet material. The inner liner 46 is retained against the portions 42 and 44 of the posts 14 as will be described hereinafter.

In accordance with one feature of the instant invention, the juncture of the posts 14 and a lower rail 48 is reinforced by what may be termed a pan 50 having a depressed center portion 52, outwardly embossed intermediate portions 54 and 56 which overlie the flanges 32 and 30 on the posts 14, respectively, and outwardly flanged vertical edge portions 58 and 60 which overlap one another and the bight portion 24 of the post 14.

The pans 50 are also provided with an outwardly displaced portion 62 which overlies the portions 42 and 44 of the posts 14. Furthermore, the pans 50 have a horizontally extending upper edge flange 64 that is displaced laterally outwardly from the flange 62 in step-like relationship so as to lie in substantially the same vertical lateral plane as the bight portion 24 of the posts 14 and the edge portions 58 and 60 of the pan 50. The skin panels 18 overlap the upper edge flange portion 64 of each of the pans 50.

As best seen in FIGURES 1 and 4 of the drawings, the flange portions 30 and 32 of the posts 14 and the center portions 52 of each of the pans 50 are secured to an upstanding flange 70 on the lower side rail 48 as by a plurality of rivets 74. The side rail 48 is secured to suitable transverse bolsters 76 as by rivets 78, a conventional flooring 80 overlying the bolsters 76 to form the internal floor of the vehicle.

In accordance with another feature of the instant invention, and as best seen in FIG. 4, a lower edge portion 82 of the plywood inner wall liner 46 is caught between an upper edge portion 84 of the flange 70 on the lower side rail 48 and the horizontal intermediate portion 62 of the pans 50. Also, the outwardly displaced portions 42 and 44 on each of the posts 14 operate to accommodate the inner wall liner 46. In this manner the liner 46 is mechanically locked against the posts 14 and lower rail 48 precluding the infiltration of foreign materials into the trailer body and leakage of materials therein outwardly of the trailer body. Further, the continuous mechanical inner lock between the lower edge portion 82 of the liner 46 and the lower rail 48 eliminates the need for auxiliary holding devices therealong.

From the foregoing description, it should be apparent that, in accordance with yet another feature of the instant invention, the attachment of the posts 14, side wall skin sections 18 and pans 50 is to the vertical flange 70 on the side rail 48. Thus, the heretofore required welds between the lower edges of the posts and the side rails of a vehicle are eliminated. The instant construction thus accommodates minute deflections of the side walls relative to the lower rail 48 and transverse bolsters 76 without deleteriously effecting the structural integrity of the junctures therebetween. Furthermore, the pans 50 function to seal the side wall skin sections 18 relative to the rail 48 as well as to effect a continuous mechanical holding of the inner wall liner 46.

It is to be understood that the specific construction of the improved trailer construction herein disclosed and described is presented for the purpose of explanation and illustration and is not intended to indicate the limits of the invention, the scope of which is defined by the following claims.

What is claimed is:
1. An improved construction for joining the side walls of trucks, trailers and the like to the lower side rails thereof comprising
   a lower side rail having a vertically extending flange,
   a vertical side wall post disposed exteriorly of the flange on said side rail, said post having
   a pair of oppositely directed flanges engageable with the outer surface of said side rail flange, the flanges on said post being outwardly upset above a point spaced below the upper edge of said side rail flange,
   a side wall inner liner having a lower edge portion secured between the upper edge of said side rail flange and the upset portion of said post,
   a side wall outer skin overlying said post on the exterior thereof,
   a side wall pan having a center portion disposed in juxtaposed relation to the vertical flange on said side rail, a vertically extending outwardly upset por- tion overlying said post, and a horizontally extending outwardly upset portion at the upper edge thereof underlying a lower edge portion of said side wall skin, and means for securing side post, side wall skin and pan to one another to form a structurally integrated assembly.

2. An improved construction for joining the side walls of trucks, trailers and the like to the lower side rails thereof comprising a lower side rail having a vertically extending flange, a pair of longitudinally spaced vertical side wall posts disposed exteriorly of the flange on said side rail, said posts having a pair of oppositely directed flanges, respectively, engageable with the outer surface of said side rail flange, the flanges on said posts being outwardly upset above a point spaced below the upper edge of said side rail flange, a side wall inner liner having a lower edge portion secured between the upper edge of said side rail flange and the upset portions of said posts, a side wall outer skin overlying said posts on the exterior thereof, a side wall pan having a center portion disposed in juxtaposed relation to the vertical flange on said side rail, longitudinally spaced vertically extending outwardly upset portions overlying said posts, respectively, and a horizontally extending outwardly upset portion at the upper edge thereof underlying a lower edge portion of said side wall skin, and means for securing side post, side wall skin and pan to one another to form a structurally integrated assembly.

References Cited in the file of this patent
UNITED STATES PATENTS
2,770,199    Madland _____ Nov. 13, 1956